(12) United States Patent
Stender, Jr.

(10) Patent No.: US 7,273,062 B1
(45) Date of Patent: Sep. 25, 2007

(54) SHUT-OFF VALVE FOR PREVENTING THE FLOW OF LIQUID THROUGH A CONDUIT, AND RELATED PROCESSES

(76) Inventor: David Flint Stender, Jr., 20 Wagon Wheel La., Scotia, NY (US) 12302

( * ) Notice: Subject to any disclaimer, the term of this patent is extended or adjusted under 35 U.S.C. 154(b) by 216 days.

(21) Appl. No.: 11/033,229

(22) Filed: Jan. 11, 2005

(51) Int. Cl.
*F16K 17/34* (2006.01)

(52) U.S. Cl. ..................... 137/2; 137/460; 137/498; 137/521

(58) Field of Classification Search ........... 137/460, 137/498, 499, 521, 553, 554; 251/118
See application file for complete search history.

(56) References Cited

U.S. PATENT DOCUMENTS

| | | | |
|---|---|---|---|
| 1,299,106 A | 4/1919 | Bacharach | |
| 2,410,984 A | 11/1946 | Lawless | |
| 2,491,104 A | 12/1949 | Garrison | |
| 3,380,474 A | 4/1968 | Mills | |
| 3,605,780 A | 9/1971 | Kranz | |
| 3,672,630 A | 6/1972 | Naumburg et al | |
| 3,754,576 A | 8/1973 | Zetterstrom et al | |
| 3,783,893 A | 1/1974 | Davison | |
| 4,088,150 A * | 5/1978 | Serratto | 137/499 |
| 4,141,380 A | 2/1979 | Lenk | |
| 4,266,569 A | 5/1981 | Wilson | |
| 4,301,833 A | 11/1981 | Donald, III | |
| 4,353,390 A | 10/1982 | Karpenko | |
| 4,488,575 A * | 12/1984 | Haaz et al. | 137/499 |
| 4,632,139 A | 12/1986 | Delwichwe | |
| 4,751,940 A | 6/1988 | Bergsma et al. | |
| 4,844,113 A * | 7/1989 | Jones | 137/39 |
| 5,392,812 A * | 2/1995 | Herron | 137/527.8 |
| 6,192,926 B1 | 2/2001 | Bueno Lopez | |
| 6,345,641 B1 | 2/2002 | Eielsen | |
| 6,581,629 B2 | 6/2003 | Eielsen | |
| 6,604,548 B2 | 8/2003 | Geisinger | |

* cited by examiner

*Primary Examiner*—Ramesh Krishnamurthy
(74) *Attorney, Agent, or Firm*—Francis T. Coppa

(57) ABSTRACT

A shut-off valve for preventing the flow of liquid through a conduit is described herein. The valve includes a valve body which defines a fluid passage, a portion of which can be venturi-shaped. The valve also includes a flow barrier which has a dimension sufficient to block fluid flow through the passage. The flow barrier is movable between an open position which allows fluid flow through the passage, and a closed position which prevents such flow. A target for detecting liquid flow is pivotally attached to the flow barrier, and is exposed to liquid flow and gas flow when the flow barrier is in the open position. When liquid flow hits the target, it swings away from the direction of flow, thereby pivoting the flow barrier to the closed position. Related methods for preventing the flow of liquid through a conduit are also described.

18 Claims, 2 Drawing Sheets

SHUT-OFF VALVE FOR PREVENTING THE FLOW OF LIQUID THROUGH A CONDUIT, AND RELATED PROCESSES

BACKGROUND OF THE INVENTION

This invention relates generally to devices for controlling fluid flow. More specifically, the invention is directed to valves which are capable of detecting and stopping the flow of liquid in a polyphase fluid stream.

A wide variety of conduits carry fluids from one location to another. For example, conventional pipelines carry air, water, oil, or other liquids and gaseous media. Networks of pipelines in the United States and other countries throughout the world handle the cross-country transportation of crude oil, refined petroleum products, and natural gas. Oil, gas, and steam pipelines often deliver these fuels directly to power-generation equipment, such as steam turbines and gas turbines.

Turbines and other power generators frequently rely on the gaseous fuels to generate mechanical energy and/or electricity. Over the course of many decades, the size and sophistication of this type of equipment has increased dramatically. Its smooth operation and longevity depend in part on the composition and quality of fuel being supplied by pipes or other conduits. (The fuel is typically hydrocarbon-based, and made up of a host of components, e.g., methane, butane, octane, and various mixtures which may contain these or other components).

The inner mechanism of a turbine usually involves rotating members (e.g., rotors) and stationary members, along with associated components. The turbines, like other power-generating equipment, can be specifically designed to run on a gas fuel with a certain heat capacity, e.g., in BTU per cubic foot. Equipment manufacturers often specify that the fuel has to have a specific temperature at the point of entry—high enough to prevent or minimize any condensation, e.g., 50° F. "superheat" being a common requirement.

The fuel mixture is sometimes in the form of a polyphase fluid moving through the pipe. For example, two-phase flow (usually gas and liquid) is often common when the fuel source is somewhat unprocessed. Two-phase flow is often a long-standing problem when the fuel is obtained directly from gas fields, for instance. As another example, the fuel may become contaminated by equipment lubricants, fuel treatment agents, or other sources. The design parameters for turbines may allow for a certain, minimal amount of liquid and other foreign components in the fuel composition. For example, a gas flow stream having minor amounts of liquid droplets suspended in a somewhat evenly-distributed manner within the stream may not adversely affect a typical gas turbine.

However, greater amounts of liquid or condensed material in the fuel stream can adversely affect turbines and similar types of equipment. For example, the gas stream may include "slugs" of liquid material. The slugs are usually a natural result of the condensation of the fuel gas itself into liquid fuel, and they are typically in the form of condensed, detached masses. Hydrocarbon liquid slugs have BTU values much greater than a pure gas composition. If the slugs are carried into the turbine, they will cause firing temperatures within the precisely-calibrated machinery to increase dramatically and uncontrollably. At a minimum, the turbine may be mechanically damaged, necessitating considerable repair cost and down-time. In some instances, the impact of the liquid slugs can actually result in the melting of the internal turbine mechanism, thereby destroying the equipment. Moreover, the passage of non-combustible slugs (e.g., aqueous slugs) into the turbine may result in thermal shock, which can also lead to extensive damage.

Certainly, steps have been taken in the past to prevent damage to power equipment from liquid slugs. The machines are usually temperature-protected, e.g., with sensors which detect abnormal temperature increases. The detection mechanism is linked to other damage-prevention systems, which can shut off the fuel stream, and/or shut down the equipment.

Moreover, knock-out drums are typically incorporated into gas fuel lines, upstream of the power generator equipment. These containment systems are designed to capture liquid and liquid slugs in the gas stream. They then contain all of the undesirable liquid components within holding tanks or "drums". Sensors attached to the drums provide an indication of liquid levels, so that steps can be taken to empty the drums before they reach capacity. The system is usually automatic, with an alarm-notice to operators.

However, shut-off mechanisms activated by temperature sensors are incapable of shutting off an improper fuel stream in time to prevent damage to the power equipment. Moreover, knock-out drums can easily become over-filled by a sudden rush of slug flow. The monitoring systems and alarm-mechanisms on the drums may not be sufficient to shut off fluid flow in time to prevent damage to the equipment. Additionally, the knock-out drums are difficult to maintain to a standard of 100% reliability.

Different types of valves in conduits have been used in the past to address the problem of liquid slug flow. For example, in U.S. Pat. No. 2,410,984 (Lawless), a valve is incorporated into a steam line. The valve prevents the surge of water and other liquids which would otherwise damage machinery operated with the steam. The valve includes a hollow sleeve with many perforations, which allow the passage of steam. The cylindrical sleeve is slidably mounted on the valve body, and is closed at one end with a disc. A spring mechanism is biased to keep the sleeve in a position which allows uninterrupted flow through the steam line. If a surge of water moves through the line, the extra force overcomes the spring tension, causing the disc to move against a valve seat. In this manner, the valve is effectively closed, thereby cutting off the flow of both steam and water through the line.

While the invention of Lawless may be suitable for preventing undesirable liquid flow in some situations, it also has some serious drawbacks. For example, the valve described therein requires an internal sleeve or piston, along with the mechanism needed to move the sleeve. These elements would be routinely exposed to any type of fluid moving through a pipe, along with solvents, dirt, or other contaminants. Such exposure would probably require a substantial maintenance effort to keep the components of the valve in operating condition, e.g., to prevent the fouling of the sliding region of the sleeve.

Moreover, it appears that the fluid in the Lawless patent must move through the perforated region of the sleeve. While these apertures may be suitable for a steam line, they are probably impractical when the fluid is natural gas or other hydrocarbons. The perforations would drastically reduce flow rates required for the efficient delivery of gaseous fuel through present-day pipelines.

Another type of valve is described in U.S. Pat. No. 4,301,833, issued to Donald, III. The Donald patent describes a valve which shuts off gas or liquid flow through a conduit when the flow rate increases beyond a pre-set limit. The valve includes a flat plate member, which can be pivoted eccentrically. In this manner, the plate can swing between a normal flow-rate position and a pipe-closure position. When flow rates through the pipe exceed a threshold amount, the forces on the plate apparently cause it to swing and close with a rapid snap action. An attached bias spring can be used to set the threshold level at which the plate will swing to the closed position.

While the invention of Donald may be effective for shutting off liquid and gas flow under some conditions, there are considerable drawbacks as well. The valve in this patent is designed to sense only changes in fluid velocity, and not fluid force or density. Therefore, the Donald valve would appear to operate under a very narrow set of conditions. For example, the bias spring could be set to release the plate at one particular flow speed. If a full-flow threshold were selected, then a "half-flow" condition would apparently not shut the pipe, even though those conditions might be allowing undesirable materials (e.g., liquid slugs) to move through the pipe. Conversely, if a half-flow threshold were selected, the valve might shut off flow prematurely, even though the fluid contents were not necessarily undesirable.

U.S. Pat. No. 3,380,474, issued to Mills, describes a "flap" valve device, for restricting fluid flow when the flow exceeds a given value. The interior of the valve is shaped to include a valve seat, toward which the fluid flows. A flapper within the valve is normally urged in an open position by means of a spring. However when fluid flow exceeds a pre-set limit, the restraining force of the spring is overcome, and the flapper is urged downward to engage the valve seat and shut off fluid flow.

While the invention of Mills may be useful in some cases, there are serious drawbacks if the device were employed in some of the situations described above. For example, the movement of the spring-controlled flapper depends only on the velocity of fluid flowing through the valve. Thus, the mechanism in that patent cannot readily discriminate between gas flow and the flow of liquid slugs, and could prematurely shut off fluid flow, resulting in the problems described herein.

Still another shut-off valve is described in U.S. Pat. No. 6,581,629, issued to Eielsen. The valve includes a housing, through which a flow passage extends. A valve body is positioned within the housing, and includes an airfoil-shaped end portion which is capable of extending into the flow passage. Under normal fluid-flow conditions, the valve body and its end portion rest on the bottom surface of the flow passage, keeping the passage generally clear. Under abnormal flow conditions, the fluid provides a lifting force which appears to cause the valve body and its end portion to pivot upward, thereby blocking fluid flow.

The shut-off valve of Eielsen could be useful for controlling fluid flow in some pipelines and other types of flow passages. However, the valve may exhibit considerable disadvantages under some flow conditions. For example, the force required to move the valve body to the blocking position results from the differential in pressure at the airfoil surface, as fluid is accelerated over the surface. (Density changes may occur as a result of undesirable liquid slugs which may be flowing within the gaseous stream). However, it appears that the lifting force for the Eielsen valve may greatly decrease as the distance from the airfoil surface increases. Thus, density changes (from liquid slugs) which do not occur immediately near the airfoil surface may not trigger the valve to shut off the flow.

Furthermore, as described in Eielsen, the valve mechanism seems to depend on the use of various communication channels, hydraulic channels, and other structural members situated beneath the valve body. (The pivoting movement of the valve body is controlled by the movement of hydraulic fluid in chambers below the body). These types of features would appear to require various shaft bearings and seals for the channels and chambers. The required bearings and seals can be the source of serious maintenance problems during the use of the valve system. This is especially problematic when the associated pipeline is carrying fluids which can corrode or otherwise weaken the seals and bearings.

In view of the discussion above, it appears that new types of shut-off valves would be welcome in the industry. The valves should be capable of readily detecting the presence of a liquid flowing in a polyphase stream, e.g., a gas pipeline susceptible to liquid slug flow. The valves should also be capable of immediately stopping the flow of all fluid through the pipeline when the liquid material is detected. Moreover, in most instances, the valve mechanism which senses liquid flow and shuts off all fluid flow should be relatively simple in construction. For example, the mechanism should be free of (or have only a minimum of) additional valve chambers, shafts, seals, or other features which could increase maintenance concerns, or which could adversely affect long-term pipeline- or valve-integrity.

BRIEF DESCRIPTION OF THE INVENTION

In view of the needs discussed above, the present inventor has discovered a shut-off valve for preventing the flow of liquid, e.g., liquid slugs, through a conduit. In one embodiment, the valve comprises:

I) a valve body, defining a fluid passage; and

II) a flow barrier, seated within the fluid passage, and having a dimension sufficient to selectively block the flow of fluid through the fluid passage, said barrier being attached by pivoting means to a target for detecting liquid flow, wherein contact of the target by a liquid flowing in the fluid passage causes the flow barrier to pivot and block the flow of fluid through the valve.

In another, specific embodiment, the valve comprises:

a) a valve body, defining a longitudinal fluid passage having an inlet and an outlet;

b) a flow barrier, having a dimension sufficient to block the flow of liquid through the fluid passage of the valve body, said flow barrier contacting a surface (e.g., the bottom surface) within the fluid passage, and being movable between an open position which allows fluid flow through the passage, and a closed position which prevents such flow;

c) a target for detecting liquid flow, and comprising a plate having a planar surface, wherein the target is pivotally attached to a portion of the flow barrier, and is movable between a first position which coincides with the open position of the flow barrier, and a second position which coincides with the closed position of the flow barrier, wherein the planar surface of the target, in the first position, is substantially perpendicular to the flow of fluid through the conduit;

such that the flow of liquid above a predetermined force value (e.g., some threshold value) is capable of shifting the target from the first position to the second position, thereby pivotally moving the flow barrier to the closed position, and preventing additional fluid flow through the conduit. (As used herein, the term "predetermined force value" is not meant to be restrictive. For example, it can simply represent the approximate force of a liquid slug which should be blocked by the valve).

In preferred embodiments, a portion of the fluid passage of the valve body is shaped in a manner sufficient to direct at least a portion of liquid (e.g., liquid slugs) flowing through the conduit to the planar surface of the target. For example, a portion of the fluid passage can be venturi-shaped. The venturi shape can be obtained by incorporating a hollow insert into the valve body.

A valve seat can support the flow barrier in the closed position. The valve seat can be formed as a shelf or lip which extends from at least a portion of the fluid passage surface into the passage.

The target is usually disc-shaped, and is typically positioned in the approximate concentric center of the fluid passage, when the flow barrier is in the open position.

The valve can further include detection means for determining whether the flow barrier is in an open or closed position. The detection means is usually in the form of some type of proximity probe. The proximity probe can be attached to a portion of the valve body, e.g., on its exterior surface.

The shut-off valve of this invention is often incorporated into a pipeline used for carrying gas, e.g., hydrocarbon gas, to various types of machinery, such as a gas turbine. In the case of a polyphase fluid, e.g., hydrocarbon gas and associated liquid condensate, the valve is capaole of completely blocking fluid flow in a timely manner. Thus, the flow of the liquid slugs or condensate into the machinery is prevented, thereby avoiding serious damage to the machinery.

Another embodiment of the invention is directed to a method for preventing the flow of liquid through a conduit which carries a flow stream comprising gas and liquid. The method includes the step of directing the flow stream through a shut-off valve like that described in the remainder of the specification.

Further details regarding the various embodiments are described below.

DETAILED DESCRIPTION OF THE INVENTION

Figure 1:
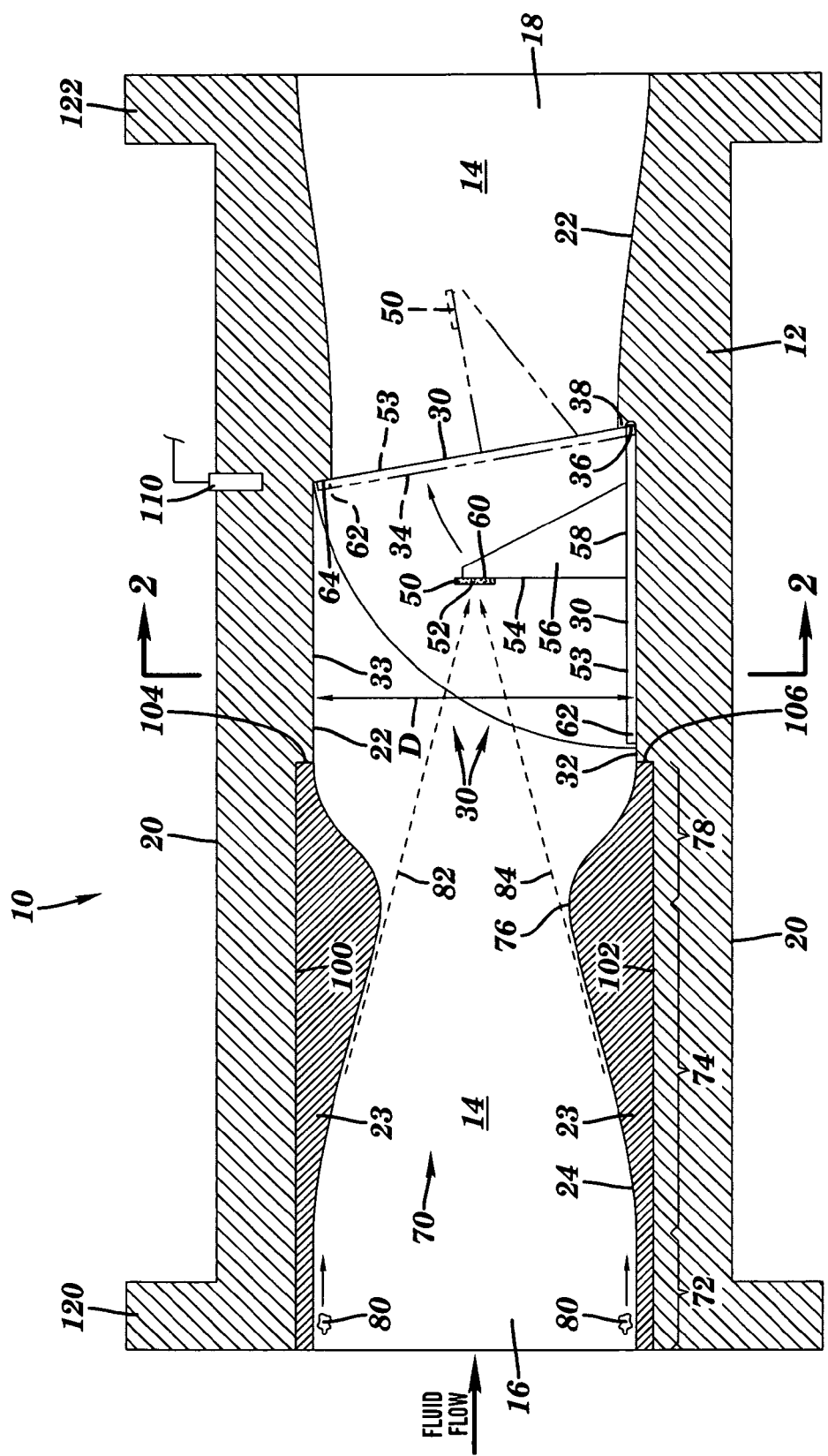
FIG. 1 is a perspective, cross-sectional view of the shut-off valve of the present invention.

FIG. 1 is a schematic, cross-sectional view of one embodiment of the shut-off valve 10 of the present invention. The valve includes valve body 12, which defines a longitudinal fluid passage 14. The fluid passage includes an inlet region 16 and an outlet region 18. The inlet region (sometimes referred to herein as the "upstream section") is closest to the source of the fluid. The outlet region (sometimes referred to herein as the "downstream section") is closest to the destination for the fluid, e.g., power equipment.

The flow of fluid is indicated by an arrow. Valve body 12 includes an exterior surface 20, and an interior surface 22. The valve body is typically cylindrical, e.g., generally tubular, although other shapes are possible. The specific shape of the valve body depends in part on the type of pipe or conduit into which the valve will be incorporated. For an industrial pipeline, the valve usually has a length of about 3× to about 5× the diameter of the conduit. The outer diameter of the valve is usually about 1× to about 2× the conduit diameter.

Valve body 12 can be formed from conventional materials, such as metals, ceramics, and composite materials. Choice of a particular material will depend on various factors, such as the type of pipe into which the valve will be incorporated, and the type of fluid being carried through the pipe. In most applications in which the pipe is some sort of fuel pipeline, the valve is made from one or more metals or metal alloys, such as stainless steel, carbon steel, or gray nodular iron.

In FIG. 1, a flow barrier 30 is depicted in an open, "down" position, resting on the lower, bottom interior surface 32 of valve body 12. Flow barrier 30 usually has a planar shape which is sufficient to block the flow of substantially all of the fluid through passage 14, when the barrier is in a closed position, as described below. Barrier 30 has a dimension which approximates (or is identical to) the cross-sectional dimension "D" of fluid passage 14. Thus, if the cross-sectional shape of fluid passage 14 is generally cylindrical, barrier 30 is also generally cylindrical, e.g., an annular disc. The disc would have a diameter substantially equal to the diameter "D" of the longitudinal fluid passage 14. (The shape of the fluid passage and the barrier may be adjusted in the region where the barrier pivots, as also described below).

Flow barrier 30 can be made from a variety of materials. Choice of a particular material will depend in part on the types of fluids moving through the conduit, as well as the potential force of those fluids (especially liquid slugs). Caustic or acidic liquids and gasses might necessitate the barrier material being made of a non-corrosive material like stainless steel or other steel alloys. In other instances, the barrier can be formed from other metals or metal alloys, plastics, ceramics, composites, or some combination of these materials.

The thickness of the barrier will also depend on some of the factors set forth above, e.g., the material from which it is made, and the type of fluids moving through passage 14. As a non-limiting example in the case of a fuel pipeline, the barrier might have a thickness in the range of about ¼ inch (0.64 cm) to about ½ inch (1.27 cm). Fluid-contact surface 34 of the barrier (shown in phantom in FIG. 1) is usually substantially flat.

Flow barrier 30 (e.g., its lower end 36) can be attached to the bottom surface 32 of the valve body by a variety of methods, such as any suitable pivoting means. For example, the flow barrier edge could be attached by the use of a suitable hinge. The hinge should be formed of a material which is substantially unaffected by gasses or liquids which would flow through the pipeline. Moreover, the hinge should be durable enough to withstand the force of any liquid material which moves the flow barrier into the closed position, as described below. The hinge could be bolted, screwed, welded, or otherwise attached to bottom surface 32 of the valve.

However, in preferred embodiments, lower end 36 of flow barrier 30 rests against a valve seat, i.e., usually without any permanent attachment to the valve seat. The valve seat could be in the form of a lip or ring 38, as shown in FIG. 1. Lip 38 extends from at least a portion of the bottom, interior surface 32 of the fluid passage.

In some embodiments, the lip or ring would extend completely around the inner diameter of the passage. Such a lip could be cast and machined as part of the valve body, or could be welded or mechanically attached to surface 22. Moreover, as mentioned further below, the lip can also be formed by machining away portions of the bottom surface 32 of the valve body, e.g., in the area immediately "upstream" of the flow barrier as it stands in the closed position. The lip supports the bottom edge of the flow barrier, helping to prevent the barrier from moving in a downstream direction within the fluid passage.

The size of the lip, i.e., its elevation from surface 32, can vary. In general, the lip should be high enough to provide support for the lower end 36 of the flow barrier, but low enough to prevent any substantial disruption of fluid flow when the barrier is in the resting position. In the case of a valve having an inner diameter of about 5-7 inches (12.7-17.8 cm), the height of the lip typically ranges from about 1/10 inch (0.25 cm) to about 1/4 inch (0.64 cm).

As shown in FIG. 1, an upper lip 64 is present, extending from the top interior surface 33 of valve body 12. Upper lip 64 functions as a support or "stop" for flow barrier 30 when the barrier swings to the closed position, as described below. The lip can be formed in the manner described for lower lip 38, e.g., by machining. Moreover, its size will generally be determined by the same factors. For a valve having the exemplary diameter described above, the upper lip typically extends in the downward direction from surface 33, with a dimension similar to that of lower lip 38.

It should be understood that alternatives to upper lip 64 are possible. For example, various types of stoppers or braces could be used, as long as they can function as an obstacle to further downstream movement of barrier 30, and can function to seal the barrier. These structures could be welded or otherwise fastened to interior surface 33, with the proviso that they not significantly interfere with fluid flow when the valve is open, i.e., when the barrier is in its resting position. (It should also be noted that, typically, lower lip 38 and upper lip 64 are part of a single shelf or lip (i.e., a valve seat) which circumferentially protrudes from the inner surface of the valve.)

In some preferred embodiments, the flow barrier 30 is positioned at an angle in the closed position. In other words, the upper end 62 of the barrier is tilted at an acute angle toward the direction of fluid flow, as shown in FIG. 1. The degree of tilting can vary somewhat. Usually, the flow barrier is tilted at an angle of about 3 degrees to about 15 degrees from vertical. The tilting of the flow barrier allows the shut-off valve to "re-set" itself when the proper composition of fluid is flowing therethrough, by allowing the barrier to swing back down to bottom surface 32 of the valve body. The flow barrier can be positioned at an angle in the closed position by forming upper lip 64 at a position which is upstream of lower lip 38, as shown in FIG. 1. However, other techniques might be used to angle the flow barrier.

The shut-off valve of this invention further comprises a target 50 for detecting fluid flow. The target is usually in the form of a plate having a generally planar, front surface 52. As shown in FIG. 1, the front surface 52 of target 50 is generally perpendicular to the direction of fluid flow, i.e., it directly faces the flow.

Target 50 can be attached to flow barrier 30 by a variety of techniques. As one non-limiting example, the target can be attached to the back surface 53 of flow barrier 30. The method of attaching the target to surface 53 is not critical. However, the attachment means should be capable of firmly securing the target, and withstanding the force of sudden closure of the flow barrier. The design of the attachment means should also not substantially interfere with gaseous fluid flow through passage 14.

In the general illustration of FIG. 1, the target is attached to an upper portion 54 of support bracket 56. Many different types of brackets or braces could be used for this purpose, depending on strength and other design considerations discussed herein. As a non-limiting example, bracket 56 can be a relatively thin steel plate which has a bottom edge 58 attached to the back surface 53 of flow barrier 30.

Various means are available for attaching support bracket 56 to flow barrier 30 (e.g., to its back surface 53), as well as to target 50 (e.g., to its back surface 60). The particular attachment technique will depend in part on the materials forming each of the components, as well as depending on the force of the fluid flowing through the valve. Welding or brazing is often used when the various components are metal. Bolts, clamps, screws, brackets, and the like could also be used. However, they are usually avoided in those situations where breakage of such mechanisms could lead to fuel passage blockage and/or foreign-object-damage to the associated machine, e.g., the turbine.

As shown in FIG. 1, the target-flow barrier structure (50, 30) usually pivots at a valve seat (sometimes referred to herein as a "pivot site") located on bottom surface 32 of valve body 12. (The flow-barrier structure in the figure is primarily shown in the open position, i.e., with the upright target. However, the figure also depicts the structure, in phantom, when the flow barrier is in the closed position). As mentioned above, the valve seat can comprise a mechanical hinge, but preferably takes the form of lip 38, formed within surface 32.

When a sufficient force (as described below) hits surface 52 of target 50, the target is pushed backward within passage 14, pivotally lifting flow barrier 30. The flow barrier swings upwardly until its upper end 62 contacts upper lip 64, thereby sealing passage 14. As shown in phantom in FIG. 1, target 50, swinging simultaneously with the flow barrier, is at that point situated downstream of the closed barrier. The passage will remain sealed by flow barrier 30 until pressure on the barrier is relieved, whereupon the barrier can return to its resting position.

Figure 2:
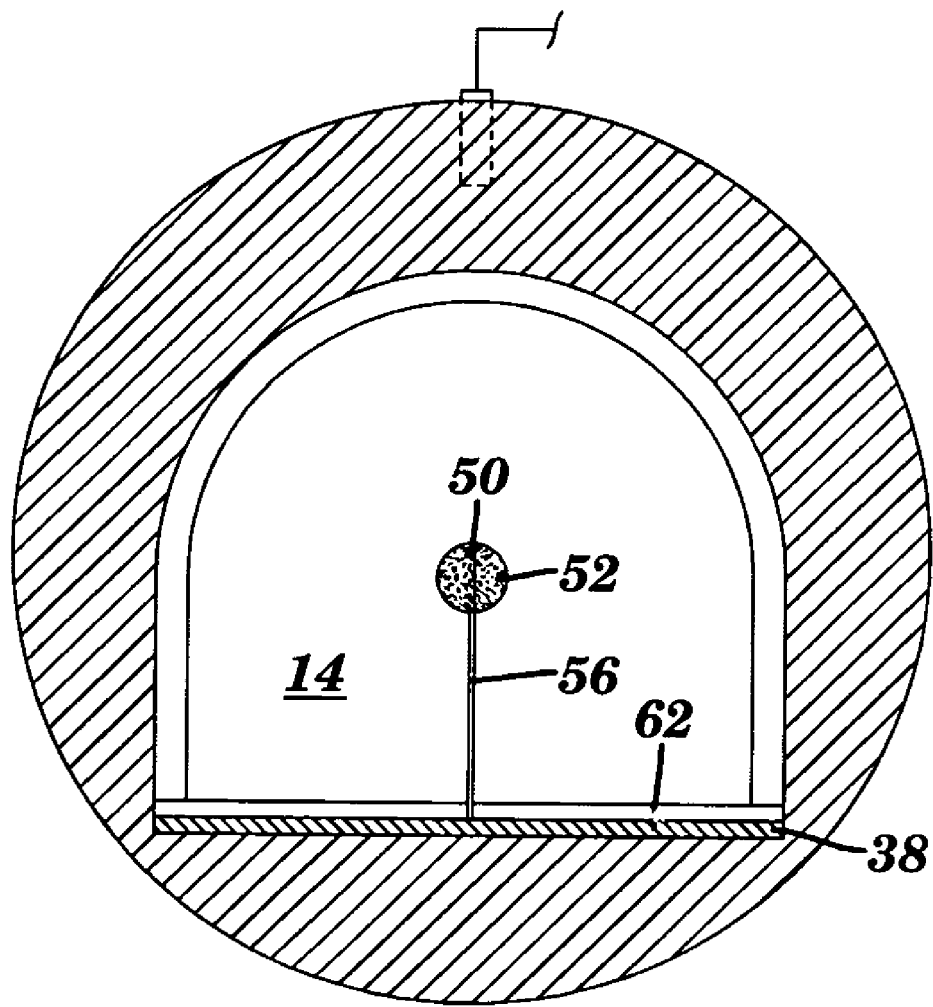
FIG. 2 is an end-view of the shut-off valve of the present invention.

The size and shape of target 50 can vary considerably. As shown in FIG. 2, the target is often circular in shape, i.e., disc-shaped. However, many other shapes are possible. Non-limiting examples of such shapes are: square, rectangular, triangular, elliptical, or cone-shaped (e.g., tip upstream, frustum downstream). The disc shape is often preferred, in part, because of the large amount of fluid-mechanical data available for such a shape, as further described below. Moreover, the target is illustrated as being relatively centered within fluid passage 14, as illustrated in FIG. 2. (This figure is an end-view, from the upstream direction). However, the position of the target can be modified somewhat, and need not be directly in the center of the passageway.

Target 50 can usually be made from any of the materials listed above for the flow barrier, e.g., metals or metal alloys, plastics, ceramics, composites, or some combination of these materials. The factors described above for selecting a flow barrier material (e.g., the type of fluid, and the potential force of that fluid) are also relevant here. In terms of durability and stiffness, metals such as aluminum, stainless steel, and alloys which include such materials, are often preferred.

The thickness of target 50 will also depend on fluid flow constituents, flow velocity, target material, and various other factors. A general illustration can be provided for a valve used in a pipe which carries liquid and gaseous hydrocarbon materials at relatively high velocities, e.g., about 20 feet/sec (6.1 meters/sec) to about 400 feet/sec (122 meter/sec). In such an instance, a stainless steel target may have a thickness of about 40 mils (0.1 cm) to about 80 mils (0.2 cm), although this range can vary.

The size of target 50 will also depend on many of the factors described previously. As mentioned above, the target functions as the "trigger" for closing flow barrier 30 when substantial amounts of liquid move through valve body 12. Thus, target 50 should be large enough to effectively sense the movement of the undesirable liquid (e.g., slugs) within the desired gaseous stream. However, the target should be small enough to not appreciably affect the normal, gaseous flow through the valve, i.e., through the pipeline in which the valve is incorporated. The target should also be small enough to avoid setting off a "false tripping" from gas-only flow and impact.

The most appropriate size for target 50 is determined in part by the force acting on it, i.e., acting on front surface 52, as depicted in FIGS. 1 and 2. That force, in turn, is determined by various factors well-known in the field of fluid mechanics. The relevant factors are described in many sources. Non-limiting examples include "The New Encyclopedia Britannica", Vol. 23 (Macropedia) 1994, by Encyclopedia Britannica, Inc., p. 747-762; and U.S. Pat. No. 6,581,629 (Eielsen), both of which are incorporated herein by reference. The total amount of force acting on the target can be influenced by fluid pressure, fluid density, flow rate, and viscosity.

The force acting on the target is sometimes referred to as "drag" or "drag-force" (D). With reference to FIG. 1, when the drag-force through passage 14 and onto target 50 exceeds a pre-determined level, the target swings backward and pivotally lifts flow barrier 30 to the closed position, as described above. The drag-force D can generally be expressed in the form of the following equation:

$$D=[(C_d)(A)\rho V^2]/2 \qquad (I)$$

wherein:

$C_d$ is the coefficient of drag for a given shape of the object in the flow;

"A" is the surface area of the target which is generally perpendicular to fluid flow;

$\rho$ is the mass density of the fluid; and

"V" is the relative velocity of the fluid, i.e., relative to the target surface.

As those familiar with fluid mechanics understand, $C_d$ is generally empirical, and expresses the frictional properties of the target surface, versus fluid rheology. (Various texts provide standard $C_d$ values for exemplary object-shapes). Moreover, the density-parameter $\rho$ is influenced by pressure, temperature, and fluid compressibility.

In the present instance, the target is designed to discriminate between flow which is primarily gaseous and flow which is primarily liquid, e.g., the flow of liquid slugs. In each instance, $C_d$, V, and A of Equation (I) remain constant. Therefore, the drag force D is directly proportional to the density $\rho$ of the fluid flowing through passage 14. (It should be understood that the present inventor does not intend to be strictly bound by the force equation and related theories described herein, although the information is helpful in generally describing how the claimed device functions).

As those skilled in the art understand, the density of a gas can be calculated according to standard formulae. Moreover, the density of a liquid component, e.g., a hydrocarbon liquid, can be found in a variety of standard chemical tables. As a non-limiting illustration, a typical hydrocarbon gas fuel which is formed primarily (e.g., 95% by weight) of methane may have a density, at 180° F. (82.2° C.), of approximately 0.6555 lbs/cf. A typical liquid fuel (e.g., a liquid hydrocarbon somewhat similar in composition and density to kerosene) may have a density of about 51.4 lbs/cf. Thus, the ratio of liquid density to gas density in this illustration is greater than 75:1.

This relative difference in density demonstrates that a target like that described herein can readily discriminate between liquid flow and gas flow. As explained above, although the speed of the liquid and the gas are substantially the same, the target is responsive to the difference in their densities. Thus, the valve of this invention allows gas to flow through at high speed, but prevents the flow of substantially all liquid species which might also be traveling at high speed within the gas stream.

In practice, some non-limiting estimates can be provided for the size of target 50, i.e., the size of its front (planar) surface 52. The front surface will typically have a surface area which is about 0.5% to about 5% of the inner diameter of fluid passage 14, at its widest portion. In the case of a disc-shaped target situated within a valve having an inner diameter of about 5-7 inches (12.7-17.8 cm), the target will typically have a diameter of about 0.25 inch (0.64 cm) to about 1 inch (2.54 cm). Those of ordinary skill in the art can determine the best size for a target having a given shape, based on the factors described herein, and on straightforward experimentation.

Moreover, it should be understood that in some embodiments, the initial force acting on the target, e.g., the force of a moving slug, is sufficient to push (pivot) the target slightly backward, resulting in a slight lifting of barrier 30 away from bottom surface 32. At that point, the continuing gas- and fluid force may "catch" the forward edge of the barrier, and forcefully thrust it into the desired, closed position. With this understanding and routine testing, adjustments can be made in target size and shape to account for this occurrence.

In preferred embodiments, at least a portion of the inlet region 16 of fluid passage 14 is venturi-shaped. As used herein, a "venturi shape" is meant to encompass any conduit shape which begins with a full diameter (or a relatively large diameter) along its length, graduates (tapers) to a constricted intermediate or "throat" section, and then gradually diverges, usually resuming the original, full diameter. As a non-limiting illustration, FIG. 1 depicts a venturi-shaped inlet region 16, in which section length 72 has a substantially full diameter. Section length 74 is gradually constricted to a maximum-constriction region 76. The upstream section then diverges along section length 78, to usually resume its substantially full diameter.

The precise venturi shape which is employed can vary substantially, and depends in part on fluid composition, fluid speed, target shape, and target size. Thus, sections 72, 74, and 78 may exhibit varying degrees of curvature. Moreover, the diameter of passage 14 in other upstream and downstream regions need not be constant, although it is usually somewhat uniform. In preferred embodiments, the venturi shape tapers and then expands in a substantially gradual manner, so as to minimize turbulence that might otherwise be created. (The turbulence could undesirably place greater stress on the target or its supporting structure). Thus, for example, maximum-constriction region 76 may actually take the form of a gradual slope, as indicated in FIG. 1.

The venturi shape is important for many embodiments. The shape induces liquid slugs moving on or near the interior surface of the valve to a more central path in the fluid passage. In this manner, the slugs are directed toward the target.

An example with respect to FIG. 1 can be provided: In the absence of a venturi shape, a number of slugs 80 may tend to stay on or close to valve surface 22, as they move downstream. (Those skilled in the art of fluid mechanics understand that slugs and other objects and fluid phases moving within a stream may often adhere to a surface along which they are flowing. This type of flow behavior is often influenced by surface tension effects). Thus, if the entire valve surface had a uniform diameter, the slugs may continue to the downstream section 18 of the valve, entirely bypassing target 50. The slugs could then continue through the valve and/or an attached pipeline, reaching attached equipment, and causing the severe problems described previously.

However, according to this inventive embodiment, the venturi shape tends to propel the liquid slugs 80 away from the interior surface of the valve, and into the primary region of fluid flow, as depicted by the illustrative, projected flow-paths 82 and 84. (The primary region of fluid flow is generally the central, concentric region of the valve). In this manner, the slugs usually would tend to hit the target surface 52, triggering closure of flow barrier 30.

The venturi shape for valve 10 can be formed by a variety of methods. For example, the shape can be cut out of the parent metal forming valve body 12. Conventional machining equipment can be used for this purpose. As further described below, valve body 12 may preferably be assembled in sections, and the desired venturi shape could be formed in one or more sections, prior to assembly.

In preferred embodiments, the venturi shape is obtained in the form of a sleeve 23 which can be inserted into fluid passage 14. The sleeve would usually fit snugly along a portion of the interior surface 22 of the valve body. Sleeve 23 would have the shape (e.g., by way of sleeve surface 24) most appropriate for influencing the path of liquid slugs, as described previously. The sleeve could be formed from a variety of materials. Preferred materials are compatible with the base material forming the valve body, and are not adversely affected (e.g., via corrosion) by any of the fluids which would move through passage 14. Sleeve materials which are relatively light, and easily "workable" (e.g., machinable) would also be of interest, as well as those which can withstand the force and temperature of the fluids being carried through the valve. Non-limiting examples of the sleeve materials are various metals or metal alloys, such as aluminum, brass, and steel, e.g., stainless steel or carbon steel. Ceramics and various composite materials could also be used in some circumstances. Sleeve 23 would usually be tightly-fitted into the fluid passage.

As a general, non-limiting illustration, the outermost region or "shell" of the venturi-shaped insert is depicted by lines 100 and 102 in the cross-sectional view of FIG. 1. In other words, the concentric region between the two lines, facing passage 14, would constitute the insert, which is in contact with valve surface 22. An advantage of this embodiment is that different inserts can be interchanged in valve body 12, depending in part on the velocity and composition of fluid flow moving through the valve. In one embodiment, the downstream edge or "rim" of the insert would rest against a seat or lip 104, 106, which has been cut into, or otherwise formed, within interior surface 22 of the valve body. (As in the case of lips 38 and 64, lips 104 and 106 can simply be portions of a single shelf or lip which circumferentially protrudes from surface 22).

In preferred embodiments, the shut-off valve further comprises detection means for determining whether the flow barrier is in an open or closed position. Various types of sensors may be used as the detection means. In preferred embodiments, the detection means is non-intrusive. In other words, it does not interfere with the valve mechanism, or affect fluid flow. The detection means should also be durable, and generally resistant to thermal- or corrosion-damage from gases or liquids moving through the flow passage. Moreover, more than one type of detection means can be employed.

A detection means of particular interest is the proximity probe, e.g., generally depicted as probe 110 in FIG. 1. Proximity probes usually function by establishing some sort of field (e.g., electrical or magnetic) in the vicinity of a movable element in a device, and then registering a change when the element moves and disturbs the field. The probes (sometimes referred to as "proximity sensors") are relatively easy to incorporate into the valve body of the present invention. In preferred embodiments, they are located in a position generally external to the fluid flow-path of the valve. Thus, they do not interfere with other features of the valve, such as the flow barrier or target. Proximity probes are well-known in the art. They are described, for example, in U.S. Pat. Nos. 5,174,152; 5,305,779; and 5,437,842, all incorporated herein by reference.

Many different types of proximity probes are commercially available. Examples include IR (infrared) probes, acoustic probes, capacitive probes, and inductive probes. (Inductive probes are often preferred in the case of electrically conductive valve materials like metals). In the illustrative embodiment of FIG. 1, probe 110 is incorporated into exterior surface 20 of the valve body, e.g., by boring a cavity within the surface. In the illustrated position, the probe is situated relatively close to upper lip 64 of valve body surface 22. Thus, the probe can readily detect closure of flow barrier 30, by sensing contact of the upper end 62 of flow barrier 30 with the upper lip.

As an alternative, the proximity probe could be incorporated into a position from which it can detect the flow barrier in its resting position, i.e., along bottom surface 32. Moreover, some embodiments include placement of multiple proximity probes and/or other sensors in various locations. The proximity probes can be monitored electronically, and remotely, according to well-established methods, so as to increase the reliability of the control process.

The valve described herein can be manufactured in a variety of ways. For example, it may be possible to assemble the valve from multiple pipe sections. Two hemispherical sections could be manufactured separately, and machined to provide the desired interior geometry.

However, in preferred embodiments, the valve is formed from a single pipe or block (e.g., a solid cylinder). For example, the valve interior could be fabricated by boring through the solid cylinder by conventional techniques. The use of a pipe, made from the desired material, and having the preferred dimensions, is particularly preferred. The pipe could be machined to provide the appropriate inner valve features, such as shelf/lips 38, 64, 104, and 106, as well as valve flanges 120 and 122. Bottom valve surface 32 and other interior surfaces could also be readily machined. For example, appropriate machining in the vicinity of flow barrier 30 would serve to provide sufficient space for the flow barrier to lay flat on the bottom surface when appropriate, and to swing freely to the closed position when necessary. As shown in FIG. 2, the bottom surface of fluid passage 14 can also be machined to provide a relatively flat base, so that flow barrier 30 can rest on the surface without interfering with gas flow, and be capable of swinging freely when necessary.

The target-flow barrier assembly would then be placed in the proper location within the valve body. An insert which provides the venturi shape discussed previously could also be incorporated into the valve at this time. Those skilled in the art will be familiar with other manufacturing details and alternatives. Valve 10 can then be incorporated into a desired conduit (e.g., a gas pipeline) by well-known procedures. For example, flanges 120 and 122 can be bolted or welded to appropriate sections of pipe.

Another embodiment of this invention is directed to a method for preventing the flow of liquid through a conduit which carries a flow stream comprising gas and liquid. The method comprises the step of directing the flow stream through the shut-off valve described above, which is incorporated into the conduit. The valve is capable of almost instantaneously discriminating between gas flow and liquid flow, e.g., liquid slugs. Thus, the flow of the undesirable liquid component into connected machinery (e.g., gas turbines) can be efficiently prevented.

Preferred and exemplary embodiments have been described herein. However, other modifications of the invention shall be apparent to those skilled in the art from these teachings. Therefore, it is intended that all such modifications which fall within the true spirit and scope of this invention be secured by the appended claims.

All of the patents, articles, and texts mentioned above are incorporated herein by reference.

What is claimed is:

1. A shut-off valve for preventing the flow of liquid through a conduit, comprising:
    a) a valve body, defining a longitudinal fluid passage having an inlet and an outlet;
    b) a flow barrier, having a dimension sufficient to selectively block the flow of fluid through the fluid passage of the valve body, and
        said flow barrier contacting a surface within the fluid passage, and being movable between an open position which allows fluid flow through the passage, and a closed position which prevents such flow;
    c) a target for detecting liquid flow, and comprising a plate having a planar surface, wherein the is target is pivotally attached to a portion of the flow barrier, and is movable between a first position which coincides with the open position of the flow barrier, and a second position which coincides with the closed position of the flow barrier,
        wherein the planar surface of the target, in the first position, is substantially perpendicular to the flow of fluid through the conduit;
        such that the flow of liquid above a predetermined force value is capable of shifting the target from the first position to the second position, thereby pivotally moving the flow barrier to the closed position, and preventing additional fluid flow through the conduit.

2. The valve of claim 1, wherein the fluid passage of the valve body is shaped in a manner sufficient to direct at least a portion of liquid flowing through the conduit to the planar surface of the target.

3. The valve of claim 2, wherein at least a portion of the fluid passage of the valve body is venturi-shaped.

4. The valve of claim 3, wherein the valve body comprises an interior surface, and a hollow insert is concentrically disposed within the valve body, contacting the interior surface of the valve, and providing the venturi shape for the fluid passage.

5. The valve of claim 4, wherein the hollow insert is formed of a material selected from the group consisting of metals, metal alloys, ceramics, and combinations thereof.

6. The valve of claim 1, wherein the flow barrier comprises an upper end and a lower end, and is positioned at an acute angle relative to the bottom surface of the valve, when the barrier is in the closed position.

7. The valve of claim 1, wherein the flow barrier is a substantially annular disc having a shape substantially identical to the cross-sectional shape of the longitudinal fluid passage.

8. The valve of claim 7, wherein the flow barrier is formed of a material selected from the group consisting of metals, metal alloys, plastics, and composite materials.

9. The valve of claim 1, further comprising a valve seat which supports the flow barrier in the closed position.

10. The valve of claim 9, wherein the valve seat comprises a lip which extends from at least a portion of the fluid passage surface into the fluid passage.

11. The valve of claim 1, wherein the target is substantially disc-shaped.

12. The valve of claim 11, wherein the target is positioned in the approximate concentric center of the fluid passage, when the flow barrier is in the open position.

13. The valve of claim 1, further comprising detection means for determining whether the flow barrier is in an open or closed position.

14. The valve of claim 13, wherein the detection means comprises a proximity probe, attached to a portion of the valve body.

15. A pipeline, comprising at least one shut-off valve according to claim 1.

16. The pipeline of claim 15, at least partially filled with a polyphase fluid comprising at least one gas and at least one liquid.

17. The pipeline of claim 16, wherein the gas comprises hydrocarbon fuel, and the liquid comprises hydrocarbon slugs.

18. A method for preventing the flow of liquid through a conduit which carries a flow stream comprising gas and liquid, comprising the step of directing the flow stream through a shut-off valve which itself comprises:
    I) a valve body, defining a fluid passage; and
    II) a flow barrier, seated within the fluid passage, and having a dimension sufficient to block the flow of fluid through the fluid passage, said barrier being attached by pivoting means to a target for detecting liquid flow, wherein contact of the target by a liquid flowing in the fluid passage causes the flow barrier to pivot and block the flow of fluid through the valve.

* * * * *